United States Patent
Ehgartner et al.

(10) Patent No.: US 11,441,738 B2
(45) Date of Patent: Sep. 13, 2022

(54) PRESSURE VESSEL SYSTEM FOR A MOTOR VEHICLE

(71) Applicant: Bayerische Motoren Werke Aktiengesellschaft, Munich (DE)

(72) Inventors: Lorenz Ehgartner, Garching (DE); Marcus Juentgen, Falkensee (DE); Andreas Pelger, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 431 days.

(21) Appl. No.: 16/517,761

(22) Filed: Jul. 22, 2019

(65) Prior Publication Data

US 2019/0338887 A1    Nov. 7, 2019

Related U.S. Application Data

(63) Continuation of application No. PCT/EP2018/050679, filed on Jan. 11, 2018.

(30) Foreign Application Priority Data

Jan. 23, 2017   (DE) ...................... 10 2017 201 045.2

(51) Int. Cl.
*F17C 13/04* (2006.01)
*B60L 50/70* (2019.01)
*H01M 8/04082* (2016.01)

(52) U.S. Cl.
CPC .............. *F17C 13/04* (2013.01); *B60L 50/70* (2019.02); *H01M 8/04201* (2013.01);
(Continued)

(58) Field of Classification Search
CPC .............. F17C 13/04; F17C 2205/0332; F17C 2205/0335; F17C 2205/0338;
(Continued)

(56) References Cited

U.S. PATENT DOCUMENTS

| 2,800,343 A | * | 7/1957 | Ulrich | ...................... | F16L 37/33 |
| | | | | | 137/614.04 |
| 3,646,964 A | * | 3/1972 | Stratman | ................. | F16L 37/30 |
| | | | | | 137/614.03 |

(Continued)

FOREIGN PATENT DOCUMENTS

| CN | 2883868 Y | 3/2007 |
| CN | 201706188 U | 1/2011 |

(Continued)

OTHER PUBLICATIONS

Chinese-language Office Action issued in Chinese Application No. 201880006398.6 dated Aug. 28, 2020 with English translation (14 pages).

(Continued)

*Primary Examiner* — Timothy L Maust
*Assistant Examiner* — James R Hakomaki
(74) *Attorney, Agent, or Firm* — Crowell & Moring LLP

(57) ABSTRACT

A pressure vessel system for a motor vehicle has at least one pressure vessel, to which an extraction line is connected. The extraction line has a connection point, to which a connection line leading to a consumer is connected. The connection point of the extraction line includes a first coupling part of a quick coupling, to which a second coupling part of the quick coupling, arranged on the connection line, is connected. The first coupling part has a non-return valve, which closes the extraction line when the second coupling part is decoupled.

10 Claims, 4 Drawing Sheets

(52) U.S. Cl.
CPC .......... F17C 2205/037 (2013.01); F17C 2205/0332 (2013.01); F17C 2205/0335 (2013.01); F17C 2205/0338 (2013.01); F17C 2205/0364 (2013.01); F17C 2221/012 (2013.01); F17C 2221/014 (2013.01); F17C 2221/017 (2013.01); F17C 2221/033 (2013.01); F17C 2223/0123 (2013.01); F17C 2223/0153 (2013.01); F17C 2223/036 (2013.01); F17C 2265/065 (2013.01); F17C 2265/066 (2013.01); F17C 2270/0168 (2013.01); F17C 2270/0184 (2013.01); H01M 2250/20 (2013.01)

(58) Field of Classification Search
CPC ........ F17C 2205/0364; F17C 2205/037; F17C 2221/012; F17C 2221/014; F17C 2221/017; F17C 2221/033; F17C 2223/0123; F17C 2223/0153; F17C 2223/036; F17C 2265/065; F17C 2265/066; F17C 2270/0168; F17C 2270/0184; B60L 50/70; H01M 8/04201; H01M 2250/20; Y02E 60/32; Y02E 60/50; Y02T 90/40
USPC .............. 141/231, 82, 65, 325; 429/513
See application file for complete search history.

(56) References Cited

U.S. PATENT DOCUMENTS

| | | | | |
|---|---|---|---|---|
| 3,934,454 A * | 1/1976 | Simo | ................ | G01N 33/0004 73/29.02 |
| 4,691,941 A | 9/1987 | Rabushka et al. | | |
| 5,474,104 A | 12/1995 | Borland et al. | | |
| 5,529,089 A | 6/1996 | Hicks et al. | | |
| 5,704,387 A | 1/1998 | Sims | | |
| 6,558,823 B1 * | 5/2003 | Pinney | ................ | B64D 37/32 244/135 R |
| 6,717,848 B2 * | 4/2004 | Kim | ................ | G11C 11/5642 365/185.03 |
| 9,404,620 B2 * | 8/2016 | Cohen | ................ | F17C 5/06 |
| 9,586,806 B2 * | 3/2017 | Mathison | ................ | F17C 5/06 |
| 9,863,583 B2 * | 1/2018 | Youlio | ................ | F17C 13/04 |
| 10,550,947 B2 * | 2/2020 | Koyama | ................ | F16K 27/003 |
| 2002/0170617 A1 * | 11/2002 | Veenstra | ................ | F17C 5/007 141/94 |
| 2003/0075234 A1 * | 4/2003 | Baltes | ................ | F17C 13/04 141/65 |
| 2003/0102051 A1 * | 6/2003 | Hasaka | ................ | F17C 13/04 141/325 |
| 2003/0213521 A1 * | 11/2003 | Downie | ................ | F17C 13/04 137/505.33 |
| 2004/0061089 A1 * | 4/2004 | Payne | ................ | F16L 55/07 251/156 |
| 2005/0056338 A1 * | 3/2005 | Hertzler | ................ | F17C 13/04 141/2 |
| 2006/0016512 A1 * | 1/2006 | Takano | ................ | F17C 13/026 141/82 |
| 2008/0105310 A1 * | 5/2008 | Ogami | ................ | F17C 13/04 137/557 |
| 2010/0193529 A1 * | 8/2010 | van der Maas | ................ | F17C 7/00 222/3 |
| 2010/0327575 A1 * | 12/2010 | Blanchard | ................ | F16L 37/1215 285/34 |
| 2011/0120297 A1 * | 5/2011 | Bitter | ................ | F15B 20/007 91/468 |
| 2013/0032221 A1 * | 2/2013 | Breuer | ................ | F16K 17/38 137/72 |
| 2013/0288160 A1 * | 10/2013 | Kurre | ................ | H01M 8/04201 429/513 |
| 2015/0107369 A1 * | 4/2015 | Downie | ................ | G01F 1/36 73/861.19 |
| 2015/0107679 A1 * | 4/2015 | Downie | ................ | G05D 11/137 137/7 |
| 2017/0023150 A1 * | 1/2017 | Hausmann | ................ | F16K 1/12 |
| 2017/0314739 A1 * | 11/2017 | Rieker | ................ | F17C 13/028 |

FOREIGN PATENT DOCUMENTS

| | | |
|---|---|---|
| CN | 202493899 U | 10/2012 |
| CN | 205065137 U | 3/2016 |
| DE | 199 55 204 B4 | 1/2011 |
| DE | 10 2011 104 711 A1 | 12/2012 |
| EP | 0 340 879 A1 | 11/1989 |
| RU | 2 189 522 C1 | 9/2002 |
| WO | WO 03/056232 A1 | 7/2003 |

OTHER PUBLICATIONS

International Search Report (PCT/ISA/210) issued in PCT Application No. PCT/EP2018/050679 dated Mar. 15, 2018 with English translation (four (4) pages).

German-language Written Opinion (PCT/ISA/237) issued in PCT Application No. PCT/EP2018/050679 dated Mar. 15, 2018 with English translation (seven (7) pages).

German-language Search Report issued in counterpart German Application No. 102017201045.2 dated Nov. 30, 2017 with partial English translation (17 pages).

Cover page of EP 1 463 905 A0 published Oct. 6, 2004 (one (1) page).

Chinese-language Office Action issued in Chinese Application No. 201880006398.6 dated May 7, 2021 with English translation (13 pages).

* cited by examiner

PRESSURE VESSEL SYSTEM FOR A MOTOR VEHICLE

CROSS REFERENCE TO RELATED APPLICATIONS

This application is a continuation of PCT International Application No. PCT/EP2018/050679, filed Jan. 11, 2018, which claims priority under 35 U.S.C. § 119 from German Patent Application No. 10 2017 201 045.2, filed Jan. 23, 2017, the entire disclosures of which are herein expressly incorporated by reference.

BACKGROUND AND SUMMARY OF THE INVENTION

The technology disclosed here relates to a pressure vessel system for a motor vehicle.

A pressure vessel system or pressure tank storage system of the prior art with a service port shall be explained with reference to FIG. 1.

From a pressure vessel (not shown in FIG. 1), an extraction line 1 leads across a pressure regulator 2 to a connection point 3. The connection point 3 is devised as a screw point, at which one end of the extraction line 1 and one end of a connection line 4 are screwed together. The connection line 4 leads to a fuel cell stack 5. In this way, an anode space of the fuel cell stack 5 can receive hydrogen coming from the pressure vessel. A service port 6 is designed here as a T-piece, i.e., a branching off from the extraction line 1 or supply line. A blind plug 7, which in the present instance is screwed into the branch of the extraction line 1 or into the service port 6, closes the service port 6 when no servicing device is to be connected to the extraction line 1.

In the event of servicing, for example, it may be provided to defuel the pressure vessel, i.e., to drain the hydrogen from the pressure vessel. For this, an appropriate extraction device may be connected to the service port 6. Via the service port 6 the fuel cell stack 5 may also receive an outside supply, for example in the course of a servicing or a measuring of the fuel consumption of the fuel cell stack 5. Furthermore, the pressure vessel may be fueled with an inert gas via the fueling path, and the inert gas may be drained once more or defueled via the service port 6. This prevents oxygen contained in air present in the pressure vessel from forming an explosive mixture together with hydrogen introduced into the pressure vessel. Moreover, components situated downstream from the pressure regulator 2, such as the fuel cell stack 5, can be rendered inert via the service port 6. In variants of the pressure vessel system, a supply device or extraction device may also be connected via a quick coupling to the service port 6.

When it is necessary to connect the pressure vessel system having the extraction line 1 with the connection point 3 to the fuel cell stack 5 for example during the installation process, the pressure vessel may be filled for example with inert gas or filled with hydrogen. But if a blind plug (not shown) is then removed for the connecting of the connection line 4 to the extraction line 1 in the area of the connection point 3, the pressure must first be released. One must make sure that no screw connections or the like are opened under pressure. In this way, inert gas or hydrogen is lost. Accordingly, either a process step increasing the installation expense must be provided (namely, the pressure releasing and renewed inerting, since the pressure vessel system was opened), or consumer gases will be lost during an installation or repair. This is a drawback.

One preferred problem which the technology disclosed here proposes to solve is to lessen or eliminate at least one drawback of an already known solution or to propose an alternative solution. In particular, a preferred problem of the technology disclosed here is to create a pressure vessel system involving less expense during installation or servicing. Further preferred problems may emerge from the advantageous effects of the technology disclosed here.

A pressure vessel system according to the invention for a motor vehicle comprises at least one pressure vessel, to which an extraction line is connected. The extraction line has a connection point, to which a connection line leading to a consumer is connected. The connection point of the extraction line comprises a first coupling part of a quick coupling, to which a second coupling part of the quick coupling arranged on the connection line is connected. A quick coupling in the sense of the technology disclosed here is a hose coupling or a pipe coupling or in general a fluid line coupling which joins together two fluid lines in a releasable manner. For simplicity in the following the term "quick coupling" shall be used. The first coupling part comprises a check valve, which closes the extraction line when the second coupling part is uncoupled. In this way, the connection point of the extraction line may be used optionally as a service port or for connecting the connection line leading to the consumer. Thus, various functions can be provided by fewer components as compared to the prior art described with reference to FIG. 1. Moreover, there are fewer leakage points as compared to this prior art, because both screw connections and the T-piece in the extraction path and in the extraction line are eliminated. Furthermore, a connected coupling part is generally tighter than a nonconnected coupling part (sealed off by means of a check valve).

The technology disclosed here accordingly relates to a pressure vessel system (or compressed storage system, CS system) for a motor vehicle. The pressure vessel system serves for the storing of fuel which is gaseous under ambient conditions. The pressure vessel system may be used for example in a motor vehicle that is operated with compressed natural gas (CNG) or liquefied natural gas (LNG) or with hydrogen.

Such a pressure vessel system comprises at least one pressure vessel. The pressure vessel may be for example a cryogenic pressure vessel (for hydrogen=CcH2) or a high-pressure gas vessel (for hydrogen=CGH2).

High-pressure gas vessel systems (=CGH2 systems) are designed to store fuel (such as hydrogen) substantially at ambient temperatures for a long period at a nominal operating pressure (or nominal working pressure, NWP) of more than roughly 350 bar gauge (=excess pressure above atmospheric), moreover preferably over around 500 bar gauge and especially preferably above around 700 bar gauge.

The cryogenic pressure vessel system (=CcH2 system) comprises a cryogenic pressure vessel. The cryogenic pressure vessel can store fuel in the liquid or supercritical state of aggregation. The supercritical state of aggregation is a thermodynamic state of matter having a higher temperature and a higher pressure than the critical point. The critical point is the thermodynamic state in which the densities of gas and liquid of the material coincide, and this is present in a single phase. Whereas the one end of the vapor pressure curve in a p-T diagram is marked by the triple point, the critical point represents the other end. In the case of hydrogen, the critical point lies at 33.18 K and 13.0 bar. A cryogenic pressure vessel is especially suited to storing the fuel at temperatures which lie significantly below the operating temperature of the motor vehicle (meaning the temperature range of the vehicle's surroundings in which the vehicle is to be operated), for example at least 50 Kelvin, preferably at least 100 Kelvin or at least 150 Kelvin below the operating temperature of the motor vehicle (generally around −40° C. to around 85° C.). The fuel may be hydrogen, for example, which is stored in the cryogenic pressure vessel at temperatures of around 34 K to 360 K. The cryogenic pressure vessel may in particular comprise an inner vessel, which is designed for a nominal operating pressure (or nominal working pressure, NWP) of around 350 barg (=gauge pressure), preferably around 500 barg, and especially preferably around 700 barg or more. The fuel is stored in the inner vessel. The outer vessel closes off the pressure vessel preferably from the outside. Preferably, the cryogenic pressure vessel contains a vacuum with an absolute pressure in the range of $10^{-9}$ mbar to $10^{-1}$ mbar, moreover preferably from $10^{-7}$ mbar to $10^{-3}$ mbar and especially preferably around $10^{-5}$ mbar, which is situated at least for a portion between the inner vessel and the outer vessel in an evacuated (middle) space or vacuum V. The storage at temperatures (just) above the critical point has the advantage over storage at temperatures below the critical point that the storage medium is single-phase. Thus, for example, there is no interface boundary between liquid and gaseous.

The pressure vessel system in the present case is optimized to the weight and the required design space. Furthermore, an especially fast, i.e., low-cost installation can be achieved, since a screw connection interface is replaced by a connection in the form of the quick coupling.

Furthermore, an especially high flexibility is achieved in an assembly line end test of the pressure vessel system and this both during the assembly of the subunits, such as a fuel cell stack or an internal combustion engine as the consumer, and during the construction of the motor vehicle. This is because the quick coupling is already integrated in the extraction line or supply line.

Accordingly, the pressure vessel may already be filled with an inert gas or be filled with a fuel, especially with hydrogen, and delivered for installation, without having to mount a blind plug or similar closure piece at the connection point of the extraction line or supply line, because the end of the extraction line is already closed by the first coupling part of the quick coupling, comprising the check valve. Consequently, the step of removing such a blind plug is eliminated. Accordingly, no inert gas and no fuel is lost. Thus, both process steps and consumer gases are economized during the installation or repair of the pressure vessel system.

Furthermore, in this way a costly first fueling of the pressure vessel at the end of the assembly line, i.e., at the end of the production process (insofar as the pressure vessel was already delivered with fuel for the assembly process) can be eliminated. Thus, both the process time during placement in operation is less, and the infrastructure (for a fueling at the end of the assembly line) is less strained or especially low-cost.

In particular, when the consumer is designed as the anode space of a fuel cell stack, the fuel cell stack can be constructed without needing an inerting of the pressure vessel system in the upstream direction, i.e., toward the pressure vessel, since the extraction line is closed by the check valve when the second coupling part is uncoupled from the first coupling part of the quick coupling.

Preferably, the second coupling part also comprises a check valve, which closes the connection line when the first coupling part is uncoupled. Neither can any fuel escape from the consumer after releasing the quick coupling.

Preferably, the first coupling part especially downstream from the pressure vessel is designed as a single free end of the extraction line, to which a second coupling part can be attached as an alternative to the second coupling part arranged on the connection line, which is connected to a line of an extraction device. In other words, optionally either the consumer or the extraction device or unloading device can be connected by means of the second coupling part to the first coupling part. The extraction device is designed to extract the fuel from the pressure vessel. Moreover, the pressure vessel system is designed to transfer the fuel to the extraction device. This simplifies a servicing or a maintenance and the installation of the pressure vessel system, especially a fuel cell system.

It has proven to be further advantageous for a coupling part of the quick coupling which is connected to a line of a supply device and/or extraction device to be attachable to the second coupling part arranged on the connection line. For example, it is then possible to supply the consumer, especially the fuel cell stack, from the outside in the event of a servicing or a maintenance or overhauling, i.e., not with hydrogen coming from the pressure vessel, but from another source. On the other hand, components of the pressure vessel system can be filled for example with an inert gas such as nitrogen or helium via the supply device.

If, for example, the consumer designed as the anode space of a fuel cell stack is to be supplied with hydrogen from the outside, the connection line which may be designed in particular as a flexible line or hose can thus be removed from the extraction line. And then a corresponding mating part in the form of the coupling part of the quick coupling can be attached to the connection line. This coupling part is attached to the line of the supply device and/or extraction device. In similar fashion, this is possible when the consumer is designed for example as a combustion engine of the motor vehicle that is operated with a compressed or liquefied gas.

Preferably, the check valve is designed as a check valve which opens independently of the coupling of the second coupling part to the first coupling part. In this way, it is possible to connect at first the extraction line to the connection line via the two coupling parts and then to open the check valve in a second step. In this way, the connection between the extraction line and the connection line (or a connection of the extraction line to the line of the supply device or extraction device) can be made even when a pressure above atmospheric pressure is present in the extraction line. Even then, no escaping of medium stored in the pressure vessel system will occur. Furthermore, the force required to connect or attach the two coupling parts does not need to be applied by an excess manual pressure.

The two coupling parts can be joined together especially quickly when the quick coupling is designed as a plug-in coupling in a further advantageous embodiment. In this case, one of the two coupling parts can be shoved into the other of the two coupling parts.

Alternatively, the two coupling parts may have respective screw threads and may be able to be joined together by screwing them together. This reduces the force exerted when connecting the coupling parts to each other. This applies especially if the check valve is designed as a check valve opening independently of the coupling of the second coupling part to the first coupling part, i.e., as a check valve which can be opened after screwing together the extraction line and the connection line. In such a case, a good ergonomics or accessibility when operating the quick coupling is also less important.

It has proven to be further advantageous to design a partial region of the connection line attaching to the second coupling part as a flexible line which is in particular more flexible than other lines of the pressure vessel system, especially more flexible than the extraction line. In particular, the flexible line may be designed as a hose. This is for example advantageous when the consumer is used in a motor vehicle, because then relative movements between the consumer and the pressure vessel system (especially of lines of the pressure vessel system) are especially easily possible. In a servicing situation, the flexible hose can be removed and the hose end is preferably closed automatically.

Analogously, a partial region of the extraction line leading to the first coupling part may be designed as a flexible line, especially a hose. This furthermore facilitates the handling of the quick coupling.

At least the first coupling part can be integrated in a valve device. In this way, an especially compact pressure vessel system is realized, in which particularly many functions are provided by especially few components. This holds in particular when the valve device comprises a safety valve, by which pressure can be released from the pressure vessel.

The valve device may comprise at least one pressure reducing device arranged in the extraction line situated upstream from the first coupling part. If the pressure reducing device or pressure regulator is built into the same unit in the form of the valve device or the valve block, this is beneficial to the compactness of the pressure vessel system. However, the pressure regulator may also be located further upstream in the extraction line.

Finally, it has proven to be advantageous for the consumer to be designed as the anode space of a fuel cell stack and for the connection line to be designed as an anode supply line leading to an anode inlet of the fuel cell stack.

In this embodiment, it is preferable to design the pressure reducing device or the pressure reducer or pressure regulator so that it reduces the fuel inlet pressure prevailing at the inlet of the pressure reducer to a fuel outlet pressure or back pressure prevailing at the outlet of the pressure reducer.

The pressure reducer generally has a pressure reducing valve, which despite differing inlet pressures makes sure that a given outlet pressure is not exceeded at the outlet side. In the pressure reducer, the fuel expands. Preferably a first pressure reducer (=HPR, high pressure regulator) and downstream a second pressure reducer (=HSV, such as a fuel injector) are used.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
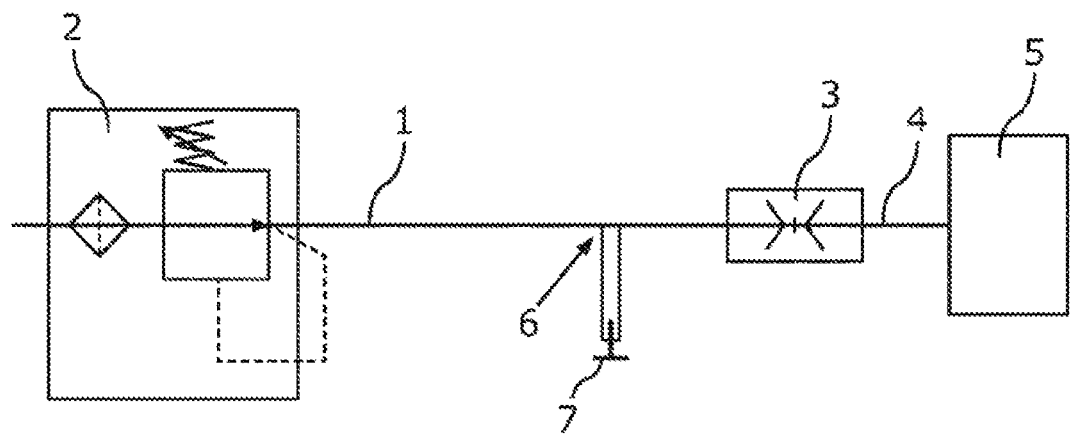
FIG. 1 illustrates, in schematic representation, components of a pressure vessel system according to the prior art.

For the explanation of the circumstances regarding FIG. 1, refer to the remarks in the introductory passage of the present specification.

Figure 2:
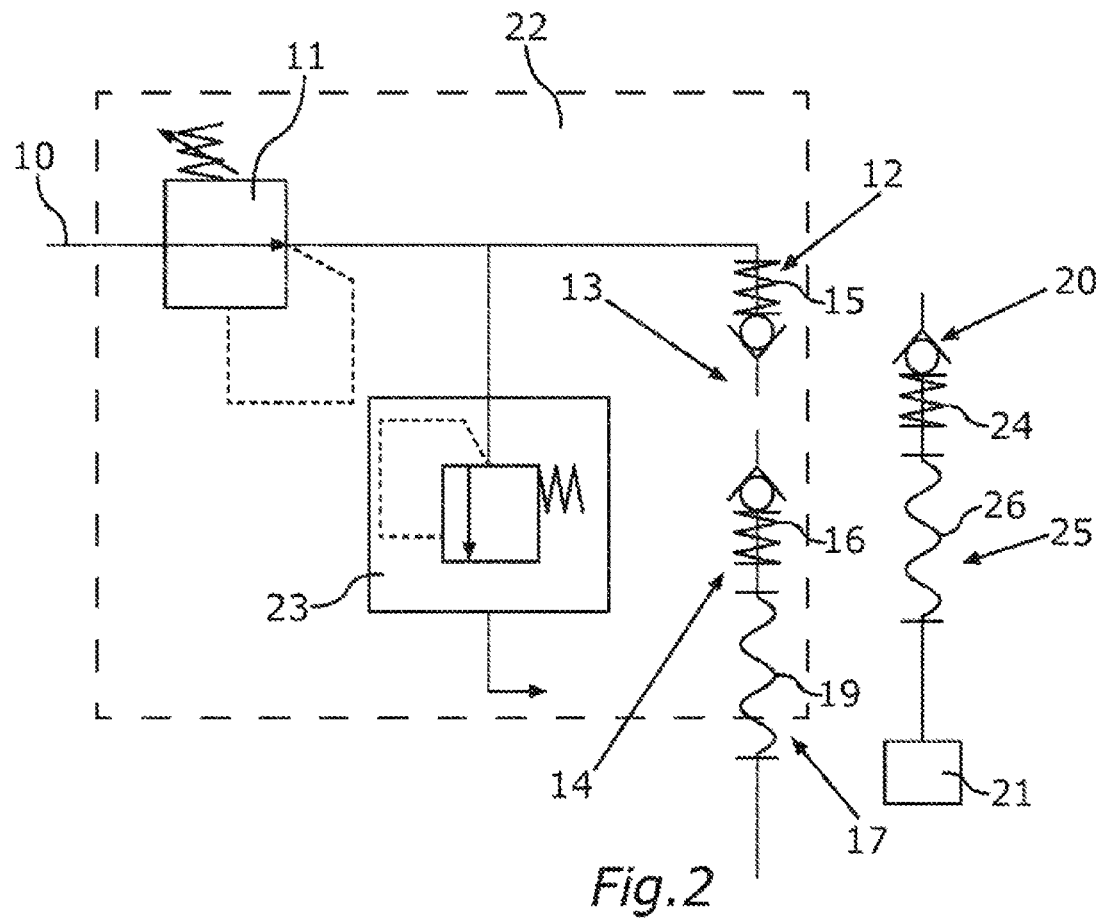
FIG. 2 illustrates, in an excerpt, components of an improved pressure vessel system.
Figure 3:
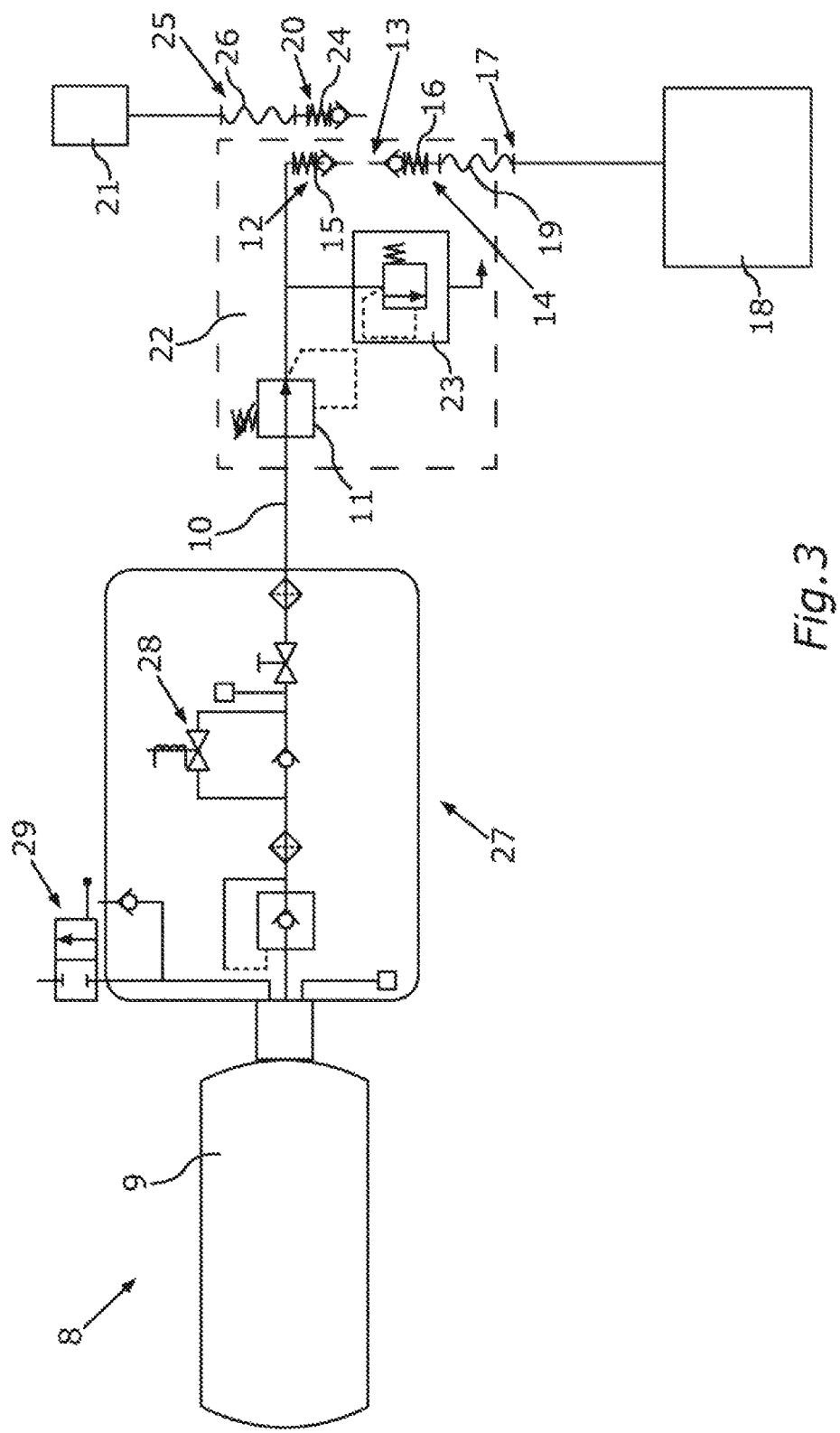
FIG. 3 illustrates, schematically, the pressure vessel system with the components of FIG. 2.

FIG. 2 shows components of an improved exemplary pressure vessel system 8 intended for a motor vehicle, which is shown schematically in FIG. 3. The pressure vessel system 8 comprises a pressure vessel 9, in which in the present instance hydrogen for example can be stored under a pressure of around 700 bar. From the pressure vessel 9, an extraction line 10 leads to a pressure regulator 11 or pressure reducer. At one free end of the extraction line 10 there is arranged a first coupling part of a quick coupling 13, which in one exemplary embodiment is shown as a plug-in coupling in FIG. 4, once in the connected state and once in the uncoupled state of the two coupling parts 12, 14.

The first coupling part 12 may be designed for example for the inserting of the second coupling part 14. However, the first coupling part 12 may also be inserted into the second coupling part 14. In variants, furthermore, the coupling parts 12, 14 of the quick coupling 13 may have screw threads and be joined together by screwing.

The first coupling part 12 comprises a check valve 15. In similar fashion, the second coupling part 14 comprises a check valve 16. This ensures that when the second coupling part 14 is uncoupled from the first coupling part 12, the extraction line 10 is closed. Furthermore, a connection line 17 is also closed by the check valve 16 when the second coupling part 14 is uncoupled from the first coupling part 12. The connection line 17 in the present exemplary embodiment of the pressure vessel system 8 leads to an anode space of a fuel cell stack 18. A partial region of the connection line 17 attaching to the second coupling part 16 is designed in the present instance as a flexible hose 19.

The first coupling part 12 of the quick coupling 13 may also be used as a service port. A coupling part 20 of a supply device 21 corresponding to the second coupling part 14 may be connected to this service port. However, the supply device 21 may also be designed as an extraction device, if the hydrogen is meant to be released from the pressure vessel 9 after connecting the coupling part 20 to the coupling part 12 of the quick coupling 13.

The supply device 21 may be designed for example as an inert gas source, in order to render the fuel cell stack 18 inert with inert gas such as nitrogen or helium. Furthermore, the coupling part 20 of the supply device 21 may be designed for attachment to the coupling part 14 of the connection line 17, for example when the fuel cell stack 18 needs to be supplied with outside hydrogen. This may be provided for example during servicing, a maintenance or overhauling, or during a repair of the fuel cell stack 18.

A valve device 22 of the pressure vessel system 8, which may comprise a safety valve 23, may be composed of the pressure regulator 11 and the free end of the extraction line 10 with the first coupling part 12.

Thanks to providing the quick coupling 13 as a connection point or interface for the coupling of the extraction line 10 to the connection line 17, a consumer such as the fuel cell stack 18 shown in the present case can be optionally attached to the extraction line 10. Alternatively, when using the first coupling part 12 as a service port, the supply device 21 or extraction device can be attached to the extraction line 10. The coupling part 20 of the supply device 21 also comprises a check valve 24 in the present case.

The coupling part 20 is furthermore connected by a line 25 to the supply device 21 or extraction device. Moreover, the line 25 leading to the supply device 21 or extraction device may also comprise a flexible partial region or hose 26. Upon releasing the coupling parts 12, 14, 20 from each other, however, the line connected to the coupling part 12, 14, 20 always remains closed due to the check valve 15, 16, 24.

When the coupling part 14 is uncoupled from the coupling part 12, accordingly, the extraction line 10 and the connection line 17 remain closed by the check valves 15, 16. In a similar manner, upon uncoupling the coupling part 20 from the coupling part 12 (or from the coupling part 14), the line 25 remains closed by the check valve 24. In this way, no blind plug or the like needs to be provided, and the cost of assembly or maintenance is reduced. Furthermore, no gas can escape from the pressure vessel system 8 during inerting or filling with hydrogen, for example.

It can be seen from FIG. 3 that the extraction line 10 can be connected to the pressure vessel 9 via a valve 27 arranged at the pressure vessel 9, also called an on-tank valve. A tank shutoff valve 28 may be integrated in the valve 27.

The on-tank valve is the valve unit directly mounted at one end of the pressure vessel 9 and directly fluidically connected to the interior of the pressure vessel. In regulation (EU) No. 406/2010 of the Commission of Apr. 26, 2010 to implement the regulation (EC) No. 79/2009 of the European Parliament and the Council on type approval of hydrogen-operated motor vehicles, such a tank shutoff valve is also called the first valve. Furthermore, the pressure vessel system 8 may comprise a pressure release device 29, especially a TPRD device (thermal pressure release device).

Figure 4:
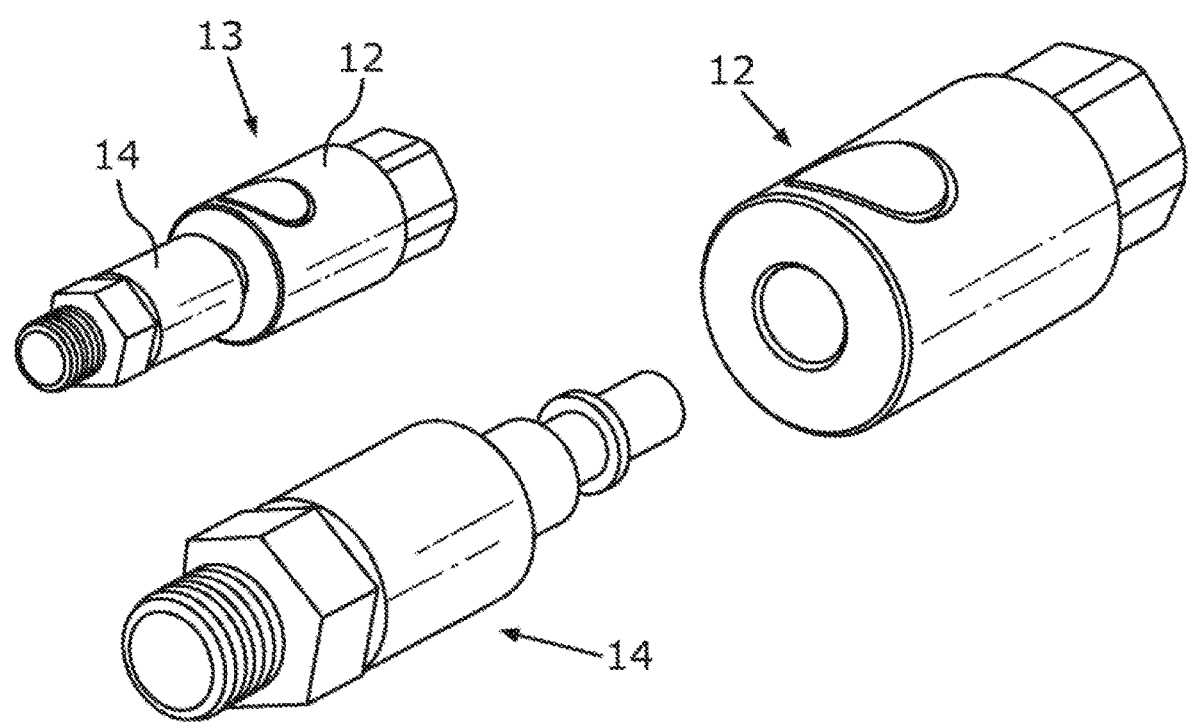
FIG. 4 illustrates, coupling parts of a quick coupling of the pressure vessel system of FIG. 2, which is designed as a plug-in coupling.
Figure 5B:
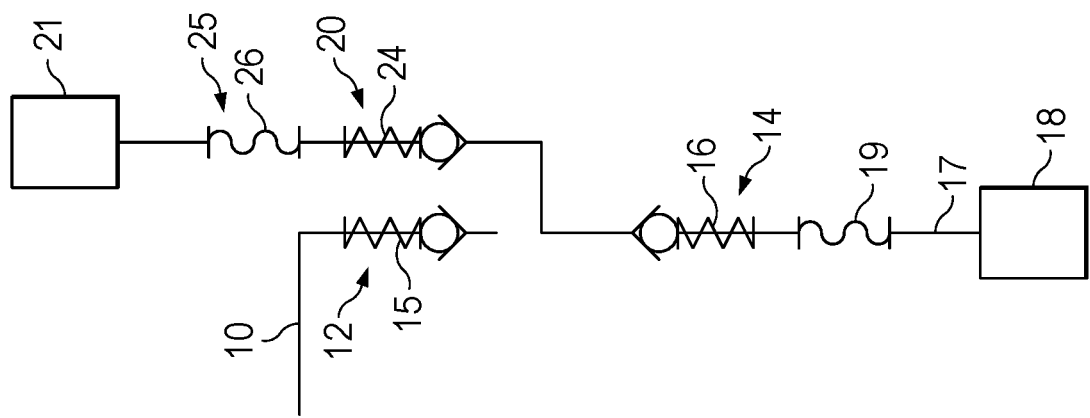
FIG. 5B illustrates, schematically, attachment of the third coupling part, which is connected to a line of a supply and/or extraction device, to the second coupling part along the connection line.
Figure 5A:
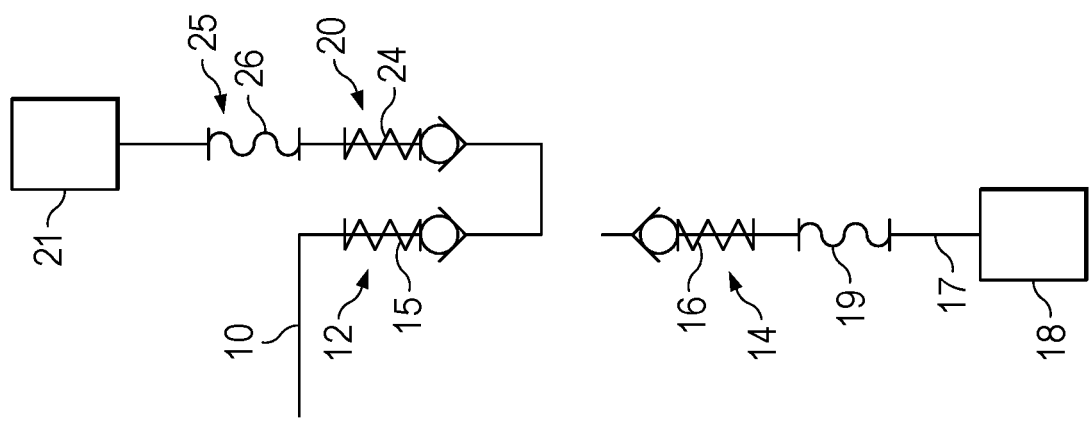
FIG. 5A illustrates, schematically, attachment of a third coupling part, which is connected to a line of a supply and/or extraction device, to the first coupling part along the extraction line.

Instead of the plug-in coupling shown for example in FIG. 4 as the quick coupling 13, the coupling parts 12, 14, 20 may also be joined together by screwing, and preferably after the screwing together the respective check valve 15, 16, 24 can be opened.

LIST OF REFERENCE SYMBOLS 1 extraction line
2 pressure regulator
3 connection point
4 connection line
5 fuel cell stack
6 service port
7 blind plug
8 pressure vessel system
9 pressure vessel
10 extraction line
11 pressure regulator
12 coupling part
13 quick coupling
14 coupling part
15 check valve (non-return valve)
16 check valve (non-return valve)
17 connection line
18 fuel cell stack
19 hose
20 coupling part
21 supply device
22 valve device
23 safety valve
24 check valve (non-return valve)
25 line
26 hose
27 valve
28 tank shutoff valve
29 pressure release device The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pressure vessel system having at least one pressure vessel for a motor vehicle, comprising:
    an extraction line that connects to the pressure vessel, wherein the extraction line has a connection point;
    a pressure reducing device along the extraction line upstream from the connection point and downstream from the pressure vessel; and
    a connection line that leads to a consumer, wherein the connection line connects to the connection point, wherein the consumer is an anode space of a fuel cell stack and the connection line is an anode supply line leading to an anode inlet of the fuel cell stack,
    a second connection line that leads to an extraction or supply device, wherein
    the connection point of the extraction line comprises a first coupling part of a quick coupling,
    a second coupling part of the quick coupling arranged on the connection line connects to the first coupling part,
    the first coupling part comprises a check valve which closes the extraction line when the second coupling part is uncoupled,
    the second coupling part comprises a check valve which closes the connection line when the first coupling part is uncoupled, and
    a third coupling part connected to the extraction or supply device by the second connection line is attachable to the first coupling part or the second coupling part.

2. The pressure vessel system according to claim 1, wherein
    the first coupling part is integrated in a valve device.

3. The pressure vessel system according to claim 2, wherein
    the valve device comprises a safety valve.

4. The pressure vessel system according to claim 3, wherein
    the first coupling part constitutes a structural unit with the safety valve and/or with the pressure reducing device.

5. The pressure vessel system according to claim 2, wherein
    the valve device comprises the pressure reducing device.

6. The pressure vessel system according to claim 1, wherein
    the check valve is configured as a check valve which opens independently of the coupling of the second coupling part to the first coupling part.

7. The pressure vessel system according to claim 1, wherein
    the quick coupling is a plug-in coupling.

8. The pressure vessel system according to claim 1, wherein
the first and second coupling parts have respective screw threads configured to be screwed together.

9. The pressure vessel system according to claim 1, wherein
a partial region of the connection line attaching to the second coupling part and/or a partial region of the extraction line leading to the first coupling part is configured as a flexible line.

10. The pressure vessel system according to claim 9, wherein the flexible line is a hose.

* * * * *